Patented June 24, 1930

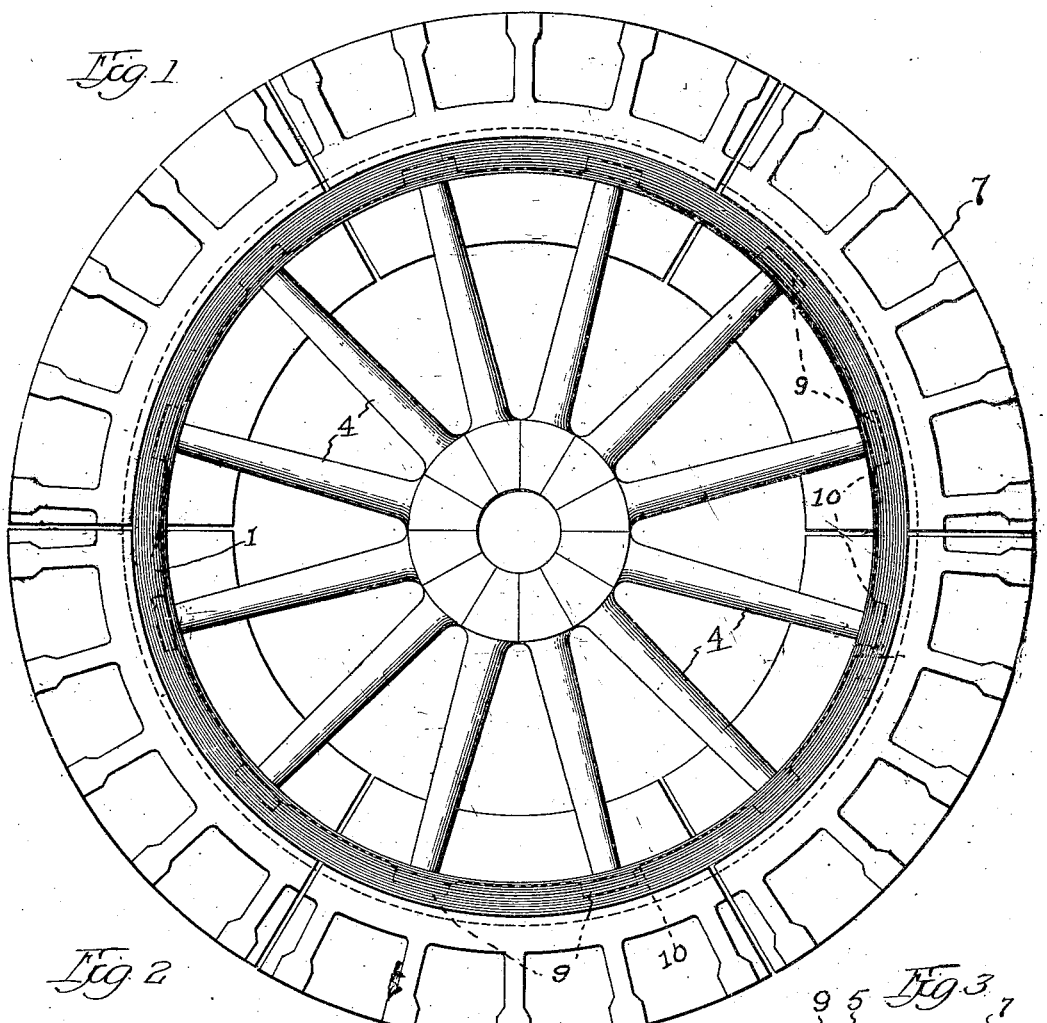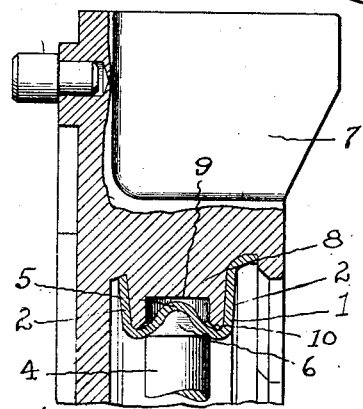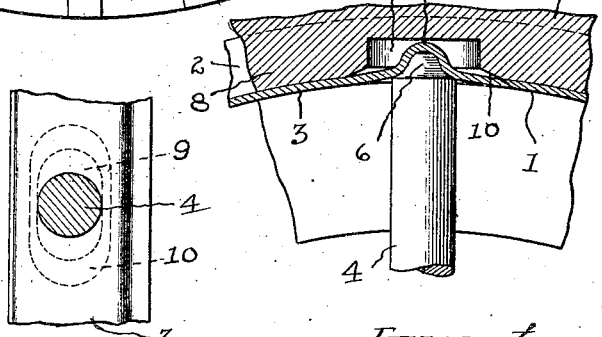

1,768,344

UNITED STATES PATENT OFFICE

JOSEPH G. SWAIN, OF AKRON, OHIO, ASSIGNOR TO THE FIRESTONE STEEL PRODUCTS COMPANY, OF AKRON, OHIO, A CORPORATION OF OHIO

WHEEL CONSTRUCTION

Application filed February 21, 1921. Serial No. 446,803.

This invention relates to the construction of wheels, particularly automobile wheels designed and intended to carry demountable tire carrying rims, and is a wheel of the type in which a metallic felloe or fixed rim is supported on a set of wooden spokes radiating from the hub of the wheel.

The method and apparatus for manufacturing the wheel is shown and described in Patent No. 1,488,845, dated April 1, 1924, the present application being drawn to the wheel itself as a new article of manufacture.

The wheel, and such portion of the apparatus used in making the same as is necessary for an understanding of the invention, is shown in the accompanying drawings, in which Fig. 1 is a complete wheel assembled in the press or tire setter, in which it is manufactured.

Fig. 2 is a section through the tire setter and wheel at a spoke end.

Fig. 3 is a section at right angles to Fig. 2.

Fig. 4 is a view looking at the radially inner surface of the felly, with a spoke in section.

The wheel, forming the subject matter of this invention is composed of a hollow metallic felloe or fixed rim, preferably of rolled steel, the felloe being indicated in general by the numeral 1 and being provided with parallel upstanding flanges 2 and a base portion 3. The spokes are indicated at 4.

The felloe is made somewhat larger than its finished circumference and is provided with a number of recesses or cups 5, which are pressed outwardly from the metal of the rim. Each cup is designed to receive a reduced rounded tenon or projection 6, formed at the end of the spoke. The felloe and the spokes are assembled as shown in Fig. 1, and placed in a tire setter or similar machine 7. This machine comprises a plurality of shoes or segments connected with any suitable mechanism, not shown, by which they may be forced inwardly simultaneously to squeeze down or compress the felloe to its finished circumference and the spokes together to form a hub, and at the same time to drive the rounded ends of the spokes into the recesses.

The inner surface of each shoe is formed with a rib 8 which fits within the two parallel flanges and bears against the base of the steel felloe. At points over each spoke end the rib is provided with an oval shaped recess or pocket which are designated by the numeral 9 and which are somewhat larger in cross sections than the spokes. Around the recesses 9 are former bevel surfaces 10 which lead into the recesses.

When the felloe in its larger circumference with the spokes assembled as shown in Fig. 1, is placed in the tire setter and the shoes forced toward the center of the wheel, the felloe will be squeezed inwardly or contracted, the mitered ends of the spokes being forced together to form the hub, and the projecting ends of the spokes being firmly seated in the recesses. The pockets or recesses 9 in the underside of the setter shoes, permit the metal in the immediate vicinity of the spoke ends to give outwardly slightly. This action prevents any possibility of crushing the mitered ends of the spokes in the squeezing down operation and establishes an area of the metal about the spoke ends which is under tension; this condition in the metal of the felloe holding the wheel together compactly after release of the pressure and removal from the tire setter.

It will be seen that during the operation of assembling the wheel the metal of the felloe in the major or principal portion is under compression but is slightly distorted at the base of the rim in the areas enclosed by the outer dotted outline of Fig. 4 and this area may be considered as under tension while the remainder of the metal composing the felloe is in true circular form.

Various other means than that shown may be devised for accomplishing the purpose of the invention, but the essential feature of the invention is the provision of an area of tension about the spoke ends without distorting the true circular form of the felloe, and the manner in which this result is attained is immaterial. The area of tension is confined to the region described by the outer limits of the surface 10, while the felloe between those points is under compression. The distortion is so slight that the true outer surface of the wheel is not disturbed, a result not found in wheels prior to my invention in which the spokes were expanded outwardly of the wheel.

It will be seen that in the finished wheel the greater area of the felloe band is in a true circle on the center of the wheel which is interrupted only at the small areas around each spoke end, which areas protrude slightly from the circular form of the wheel. It will further be noted that as the spoke ends are seated in the base of the felloe band below the flanges the protruding ends of the spokes do not interfere with the circularity of the felloe and a true circular seat for the tire rim is maintained.

The form of the recesses is not essential and while a closed cup or recess is preferred as it seals the ends of the spokes from water and utilizes the whole of the spoke in supporting the load, this form may be varied. Other variations and modifications may be suggested to those skilled in the art and such as fall within the scope of this invention are intended to be covered herein.

Claims:

1. A wheel comprising a channel-shaped steel felloe and a plurality of spokes, the base of the felloe being in circular form throughout its circumference, except at the areas immediately surrounding but not contacting the spoke ends which said areas are distorted outwardly.

2. The combination in a wheel of a hub and spokes, and a felloe contracted onto the spokes, said felloe being provided with seats for spoke ends and areas in the felloe about said seats which are outwardly distorted or relieved when the felloe is contracted, whereby the felloe is in circular form throughout its circumference excepting at and about said seats.

JOSEPH G. SWAIN.